US005798595A

United States Patent [19]

Nilsson et al.

[11] Patent Number: 5,798,595
[45] Date of Patent: Aug. 25, 1998

[54] VIBRATIONAL CONTROL SYSTEM FOR STATOR COILS

[75] Inventors: Lennart S. Nilsson, Winter Springs; Charles M. Rowe, Orlando; Donald Yaffee, Winter Springs, all of Fla.

[73] Assignee: Westinghouse Electric Corporation, Pittsburgh, Pa.

[21] Appl. No.: 777,560

[22] Filed: Dec. 30, 1996

[51] Int. Cl.⁶ .................................................. H02K 3/46
[52] U.S. Cl. ...................... 310/260; 310/194; 140/92.1; 29/736
[58] Field of Search .......................... 310/260, 194; 140/92.1; 29/736

[56] References Cited

U.S. PATENT DOCUMENTS

| | | |
|---|---|---|
| 3,691,416 | 9/1972 | Drexler et al. ........................... 310/260 |
| 3,866,073 | 2/1975 | Gjaja ...................................... 310/260 |
| 3,949,257 | 4/1976 | Cooper et al. .......................... 310/260 |
| 3,974,409 | 8/1976 | Loy ........................................ 310/260 |
| 3,988,625 | 10/1976 | Jáger et al. ............................. 310/260 |
| 3,991,334 | 11/1976 | Cooper et al. .......................... 310/260 |
| 4,016,443 | 4/1977 | Johnson ................................. 310/260 |
| 4,037,126 | 7/1977 | Brennan et al. ........................ 310/260 |
| 4,088,913 | 5/1978 | Prigorovsky et al. ................. 310/260 |
| 4,496,870 | 1/1985 | Antonov et al. ....................... 310/260 |
| 4,563,607 | 1/1986 | Cooper et al. .......................... 310/260 |
| 4,618,795 | 10/1986 | Cooper et al. .......................... 310/260 |
| 5,036,238 | 7/1991 | Tajima .................................... 310/241 |
| 5,373,211 | 12/1994 | Ramirez-Colonel et al. .......... 310/260 |

*Primary Examiner*—Steven L. Stephan
*Assistant Examiner*—Karl Tamai

[57] ABSTRACT

A vibrational control system for the coils of a stator includes a coil support bracket affixed to the stator, a coil support brace mounted on the coil support bracket with a shim arranged between the coil support brace and the coil support bracket, a push block arranged between the coils and the coil support brace, and control structure for controlling the vibrations of the stator coils.

9 Claims, 5 Drawing Sheets

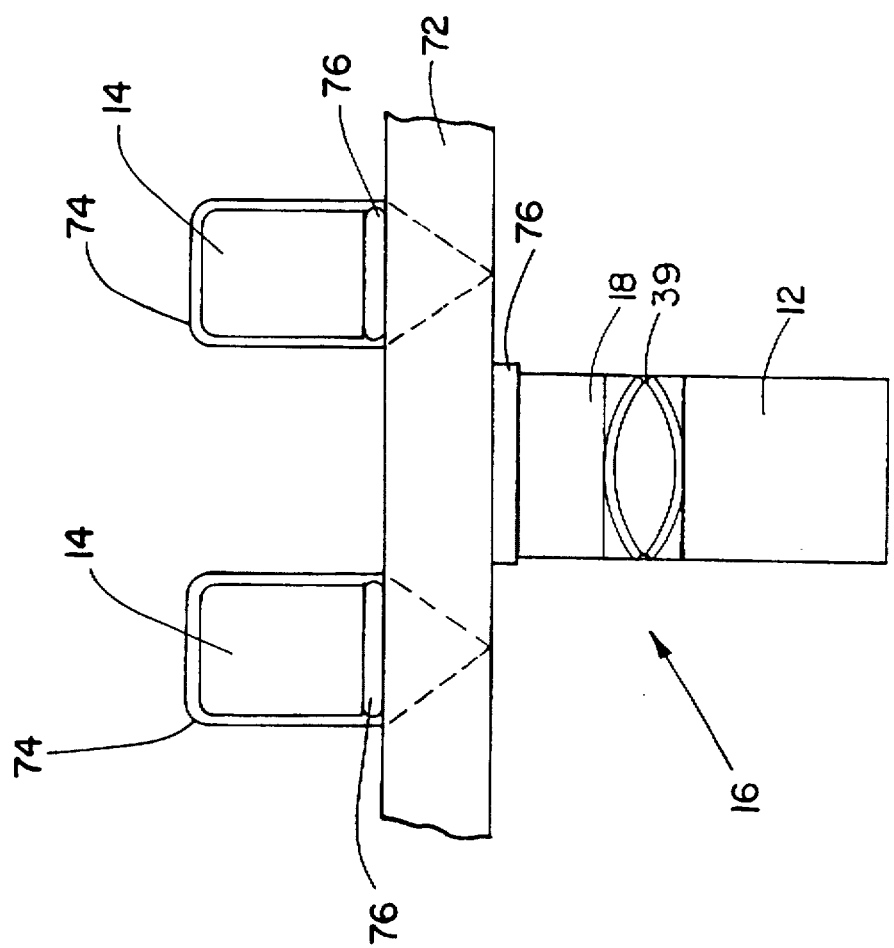

1

VIBRATIONAL CONTROL SYSTEM FOR STATOR COILS

BACKGROUND OF THE INVENTION

This invention relates to a vibrational control system for maintaining the characteristic frequency of the coils of a stator sufficiently above the operating frequency of the dynamoelectric apparatus to which the coils are affixed in order to avoid potentially destructive vibration from occurring.

In an electrodynamic apparatus such as a turbine generator, the coils of the stator have, like most mechanical objects, a characteristic natural frequency at which they will tend to vibrate. If this characteristic frequency is close to the input frequency of vibrations that are transmitted to the coils during operation of the machine, potentially damaging vibration will tend to build in the coils. This can shorten the life of the coils, causing premature failure. Failure of the coils can cause damage to the generator, could result in expensive down time, and a need for a coil replacement procedure that tends to be quite expensive.

Conventionally, the coils of a stator are loaded under pressure by a coil support brace, a shim and a coil support bracket. The coil support brace supports the stator coils. The coil support bracket is fixed to the stator core. The coil support brace is then forcefully moved away from the coil support bracket and against the end coils. A shim is then placed between the brace and the bracket while the coil support brace is still compressed against the coils. The force is then released and the brace remains compressed against the coils due to the shim. This compressive force against the coils is intended to raise the characteristic frequency of the coils away from the natural operating frequency of the apparatus to which it is attached.

Unfortunately, however, during operation of the dynamo electric apparatus the coil support bracket moves away from the coil support brace. This movement occurs because the stator to which the coil support bracket is attached contracts. As the stator core contracts in service, the coil support bracket then moves away from the coils. Consequently, the compressive force transmitted to the coils from the brace decreases. As this force decreases, the characteristic frequency of the coils will lower and may in some cases approach the resonant frequency of the apparatus. As explained above, when this occurs, the coils may fail over time as a result of excessive vibration. If a higher force can be maintained on the coils, then the characteristic frequency of the coils will not approach the natural frequency of the apparatus. Moreover, by maintaining the frequency sufficiently above the natural frequency of the apparatus, the life of the coils will be extended and the likelihood of failure will be minimized.

Thus, it is clear that there has existed a long and unfulfilled need in the prior art for a system which provides a vibrational control system to maintain the characteristic frequency of the stator coils away from the natural frequency of the apparatus to which the coils are attached during operations of the apparatus.

SUMMARY OF THE INVENTION

Accordingly, it is an object of this invention to provide a vibrational control system to maintain the characteristic frequency of coils of a stator away from the natural frequency of the apparatus to which they are attached and thereby minimize the vibration of the coils, extend their life and prevent the coils from failing.

In order to achieve the above and other objects of the invention, a vibrational control system for the coils of a stator in an electrodynamic apparatus includes a coil support brace mounted to the stator; a push block arranged between the coils and the coil support brace; and a control structure, interposed between said push block and said coil support brace, for adjusting a characteristic frequency of the stator coils.

According to a second aspect of the invention, a vibrational control system for the coils of a stator includes a coil support bracket affixed to the stator; a coil support brace mounted on the coil support bracket with a shim arranged between the coil support brace and the coil support bracket; a push block compressed between the brace and the coils, a filler material compressed between the push block and the coils and a spring between the push block and the brace for adjusting the characteristic frequency of the coils.

According to a third aspect of the invention, the spring is a ripple spring. The ripple spring is arranged in a cavity of the brace and transmits a force up through the push block to the coils to adjust a characteristic frequency of the coils.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

BRIEF DESCRIPTION OF THE DRAWINGS

FIG. 6 is a cross section taken along line 5—5 of FIG. 6.

DETAILED DESCRIPTION OF THE PREFERRED EMBODIMENTS

Figure 1:
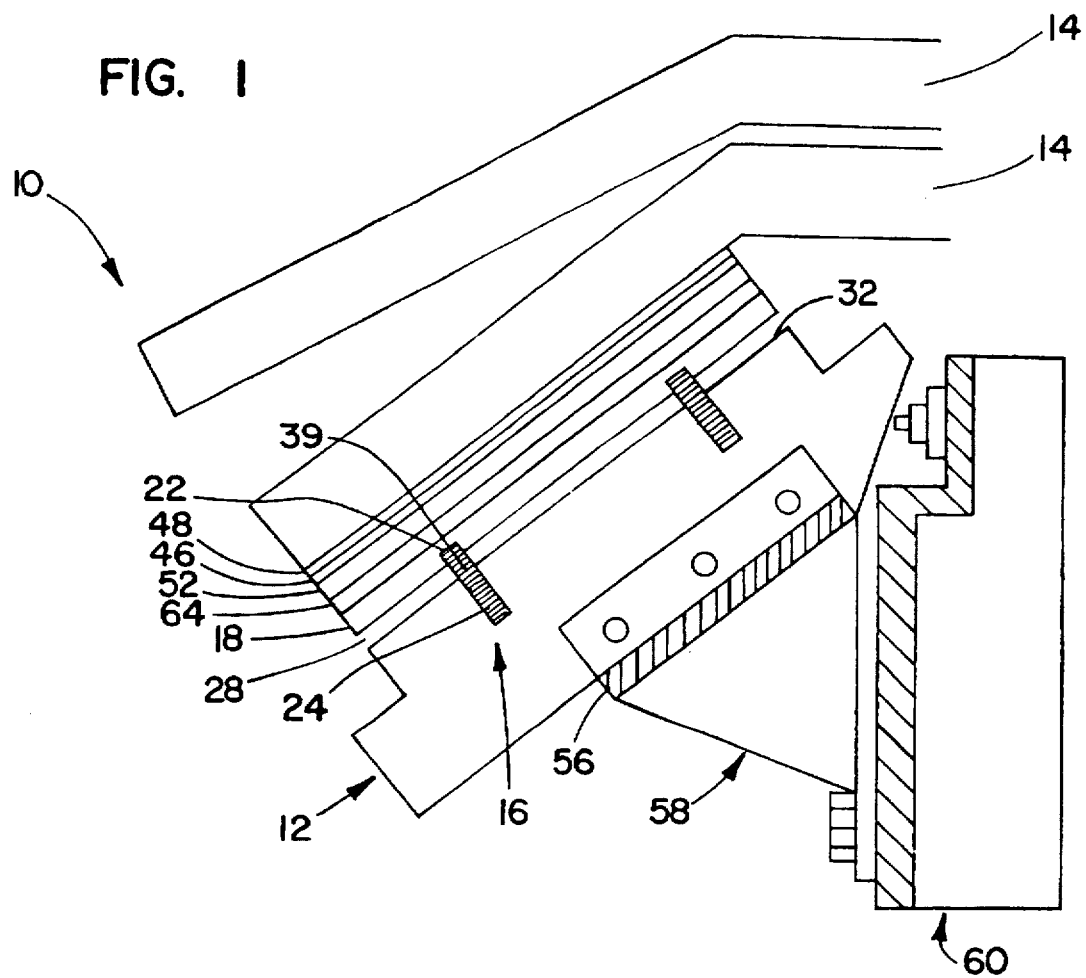
FIG. 1 is a diagrammatical view of a vibrational control system for coils of a stator that is constructed according to a preferred embodiment of the invention.
Figure 3:
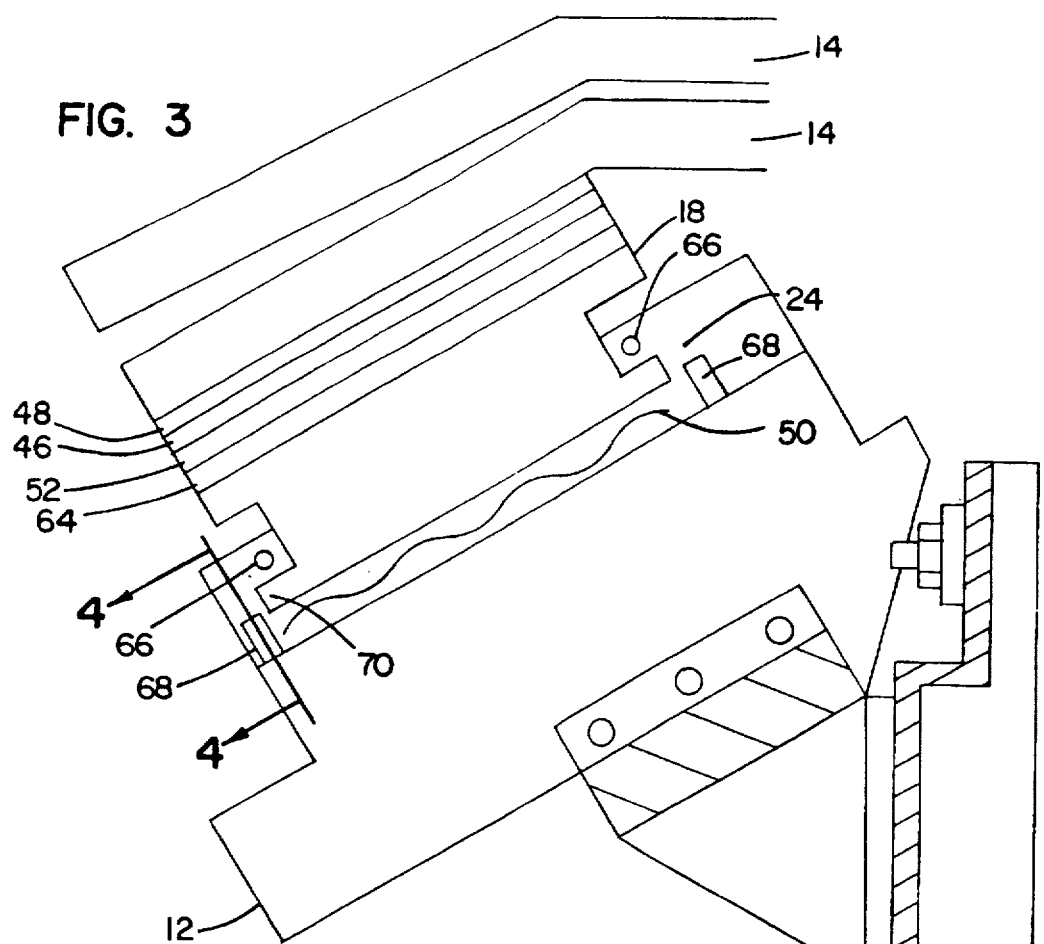
FIG. 3 is a diagrammatical view of a vibrational control system for coils of a stator that is constructed according to a second preferred embodiment of the invention.

Referring now to the drawings, wherein like reference numerals designate corresponding structure throughout the views, and referring in particular to FIGS. 1 and 3, a vibrational control system 10 for the coils 14 of a stator 60 in an electro dynamic apparatus such as electrical power generator includes a coil support brace 12 that is mounted to the stator 60 in a conventional manner, a push block 18 that is arranged between the coils 14 and the coil support brace 12, and a control mechanism 16, interposed between the push block 18 and the coil support brace 12, for adjusting a characteristic frequency of the stator coils 14.

As can be seen in FIGS. 1 and 3, a glass shim 56 is preferably positioned between the coil support brace 12 and the coil support bracket 58 that is attached to the stator 60. Glass shim 56 is removed in order to install and remove the compressive spring assembly that includes the spring 50. As discussed above and is known in the art, the function of the glass shim 56 is to place a force on the coils 14 to raise their characteristic frequency.

Figure 2:
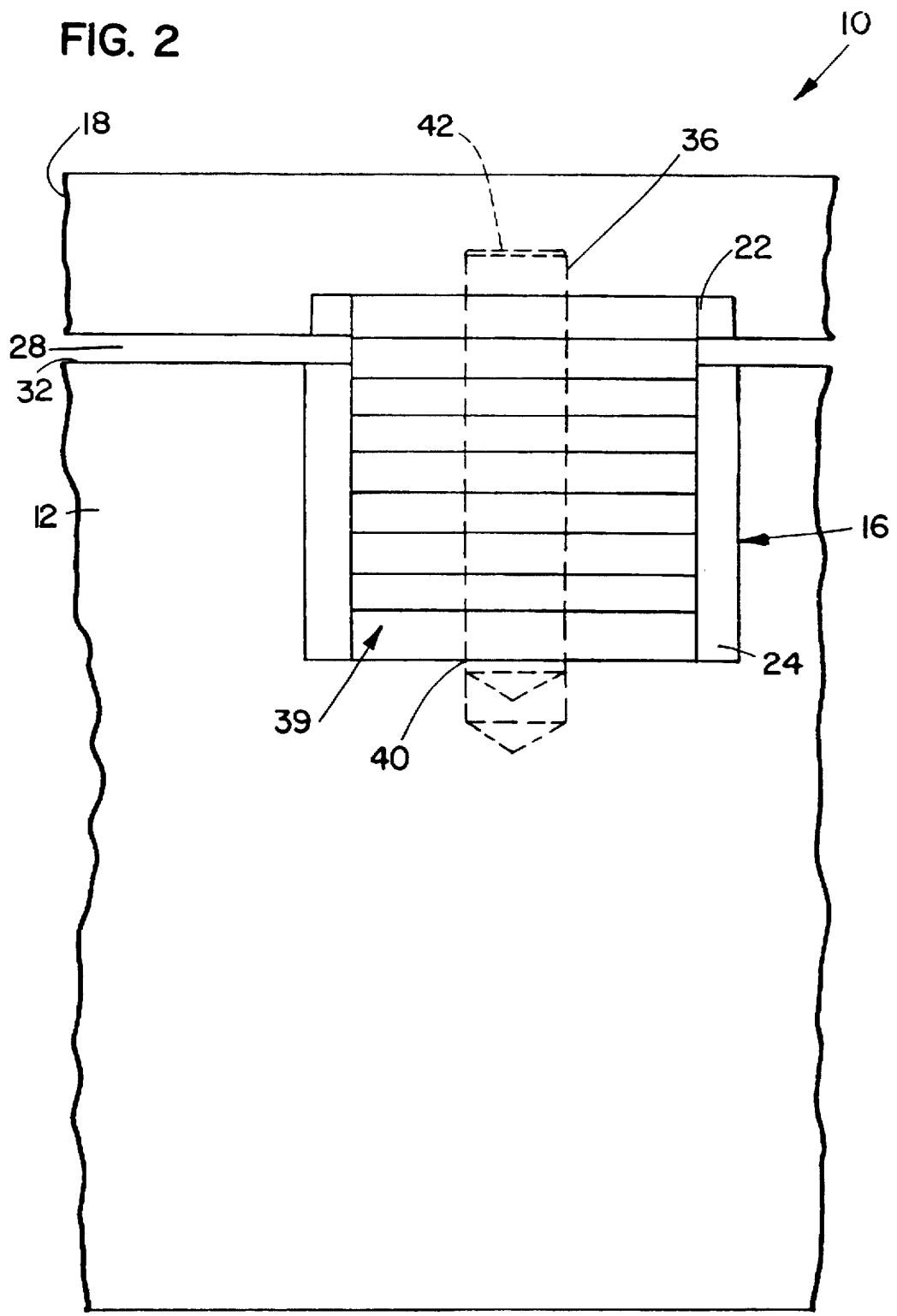
FIG. 2 is a cross-sectional diagrammatical view depicting a vibrational control structure of the embodiment depicted in FIG. 1.

In the preferred embodiments, the control mechanism 16 includes at least one spring 39 that is positioned between the push block 18 and the coil support brace 12. In the embodiment that is depicted in FIGS. 1 and 2, the springs 39 are conical springs. As shown in FIGS. 1 and 2, the spring 39 is positioned within a space that is partially defined by a downwardly facing void 22 that is defined in the push block 18, and a corresponding cavity 24 that is defined in the coil support brace 12. Alternatively, the spring 39 may rest against a surface of the push block 18 rather than extending into a void in the push block 18.

As may also be seen in FIG. 2, the control mechanism 16 further includes a pin 36 that extends from the push block 18 through a hollow core of the conical springs 39, and downwardly into contact with a bottom 40 of the cavity 24 that is defined within the support brace 12. The upper portion of pin 36 is preferably cemented to the push block 18, and may extend inwardly into the push block 18 into an attaching annulus 42 in order to facilitate a strong mechanical connection between the pin 36 and push block 18.

As may further be seen in FIG. 2, a gap 28 is defined between the push block 18 and the coil support brace 12. The size of the gap 28 and the length of push pin 36 relative to the vertical dimension of the space that is defined by void 22 and cavity 24 together determine the amount of downward deflection that is permitted against the compressive influence of the spring 39. The magnitude of the compressive force that is applied to the stator coils 14 by the spring 26 via the push block 18 depends upon the number of springs 39 and the characteristics of the springs.

Before placing the coils 14 in service, the brace 12 is compressed up toward the coils 14 with a fixture (not shown). The shim 56 is then inserted between the brace 12 and the bracket 58. As discussed above, while in service the stator 60 may contract tending to pull the bracket 58 and the brace 12 away from the coils 14. Without the vibrational control system 10, as the brace 12 moves away, the force on the coils 14 decreases as does their characteristic vibrational frequency. The vibrational control system 10 acts to prevent the compressive force from decreasing or minimize the decrease in the force and thereby maintaining the characteristic frequency of the coils 14 above the operating frequency of the dynamo electric machine (not shown) to which the coils 14 are attached. The system 10 does this as follows. As the bracket 58 and the brace 12 move away from the coils 14, the compressed springs 39 expand and push up with a force against the push block 18. The push block 18 then transmits this force to the coils 14. With the force applied, the characteristic frequency of the coils 14 is maintained above the operating frequency.

Figure 4:
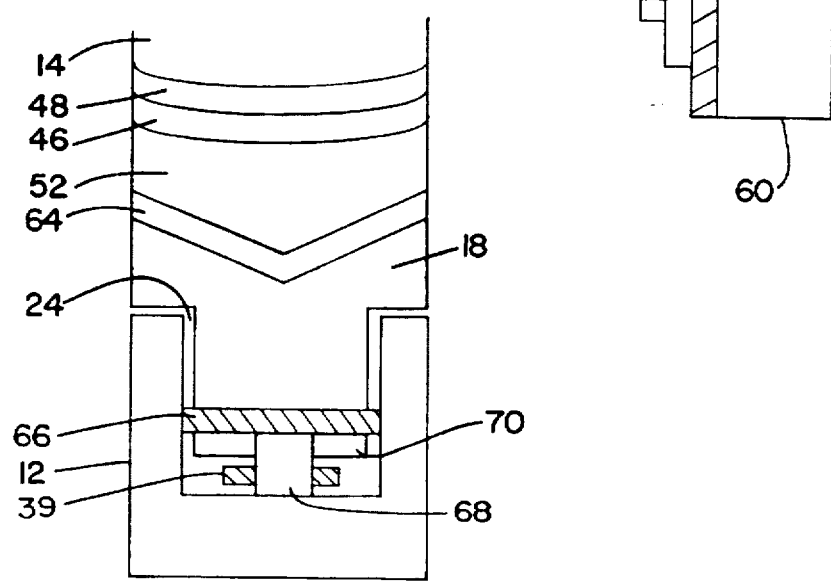
FIG. 4 is a cross section taken along line 4—4 of FIG. 3.

The vibrational control system 10 may also include a filler 46, 48 arranged between the push block 18, the coils 14, a filler cap 52 that is mounted to the push block 18, a third layer of filler material 64 arranged between the push block 18 and the filler cap 52. As is illustrated in FIGS. 1, 3–4, the filler 46, 48, the filler cap 52 and the third layer of filler 64 function to transmit the force exerted by the push block 18 to the coils 14. The filler 46, 48 may consist of a first layer of filler material 46 and a second layer of filler material 48. Preferably, the first layer of filler material 46 is fabricated from Dacron® felt or a similar material. In comparison, the second layer of filler material 48 consists of a rubber backing against the Dacron® felt with the rubber side being closest to the coils 14. This third layer of filler material may also be fabricated from Dacron® felt or a similar material.

A second embodiment of the invention is depicted in FIGS. 3 and 4. A may be seen in FIGS. 3 and 4, the spring 39 may alternatively be embodied as a ripple shaped spring that is positioned between the push block 18 and the coil support brace 12. Preferably, the ripple spring 50 consists of either molded epoxy or glass fiber. In this embodiment, the cavity 24 in the brace 12 is in the shape of a channel running the length of the brace 12. The ripple spring 39 rests inside this channel shaped cavity 24.

As shown in FIGS. 3 and 4, in this second embodiment, the system 10 may also include push block pins 66 arranged above a lip 70 on either end of the push block 18 and stops 68 at either end of the cavity 24 of the coil support brace 12. In this embodiment, the push block 18 is restrained in the cavity 24 by the pins 66. More specifically, the pins 66 are affixed to the cavity 24 above the lips 70 on the ends of the push block 18. Consequently, the push block 18 is restrained from moving in the upward direction.

Also shown in FIGS. 3 and 4 is the push block stops 68 at either ends of the push block 18. The stops 68 prevent movement of the ripple spring 39 out of the cavity 24.

The second embodiment operates similarly to the first embodiment. When the system 10 is assembled the ripple spring 39 is compressed in the cavity 24. Should the stator 60 contract while in service, the bracket 58 and the brace 12 will move away from the coils 14. If this occurs, the ripple spring 39 will push up with a force against the push block 18, and the force will then be transmitted though the filler layers 46, 48 and 64 and the filler cap 52 to the coils 14. When this force is applied to the coils 14, the frequency of the coils 14 is maintained above the operating frequency of the machine to which they are attached.

Figure 5:
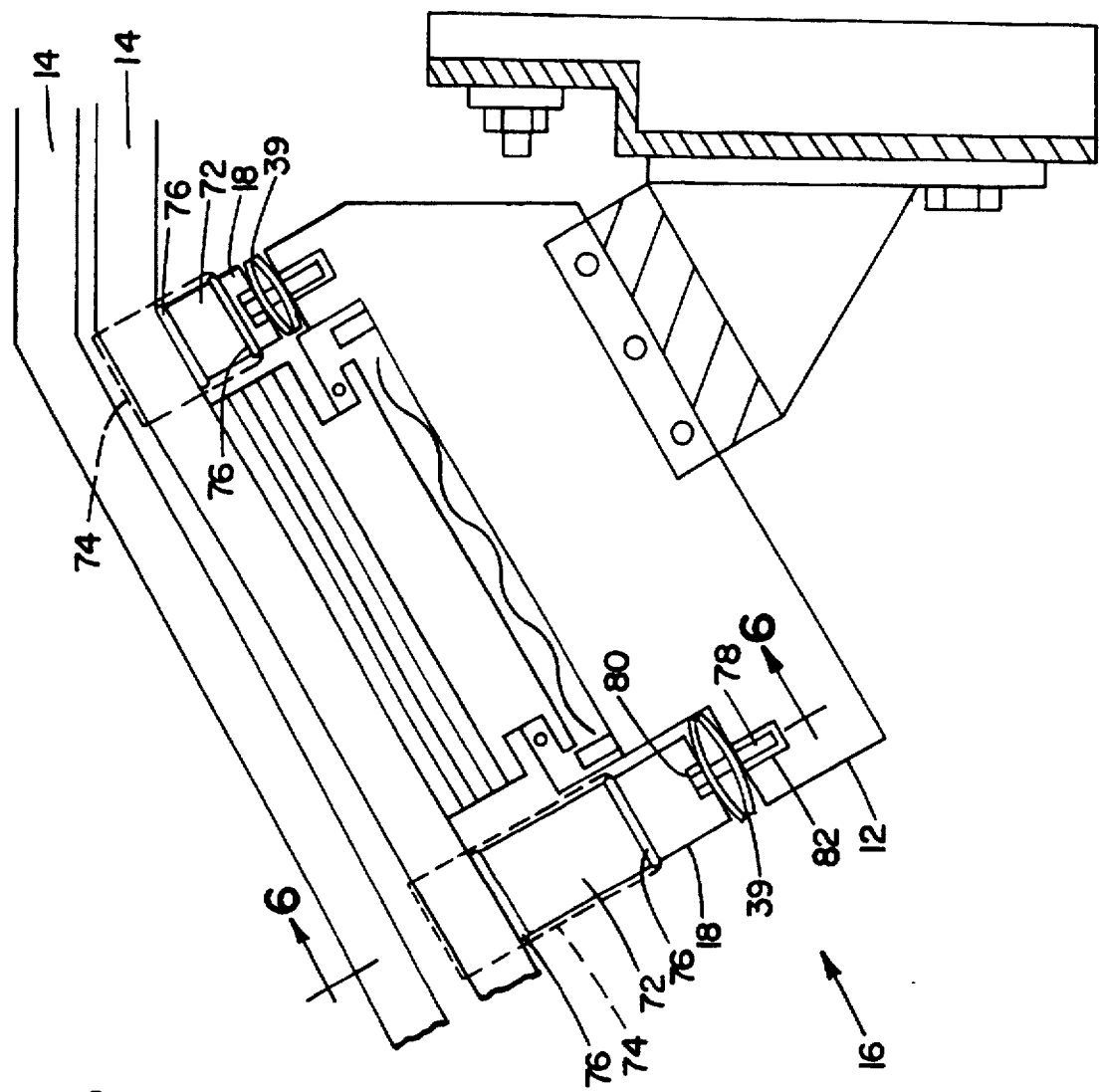
FIG. 5 is a diagrammatical view of a vibrational control system for coils of a stator that is constructed according to a third preferred embodiment of the invention.

FIGS. 5 and 6 depict a third preferred embodiment of this invention. In this embodiment, the vibrational control system 10 also includes a support ring 72 and may also have a support band 74. The support ring 72 and the support band 74 are known in the art and this invention does not relate to them specifically, but rather a way of using them with a control mechanism 16 to minimize the vibration of the coils 14.

As is known in the art, the support ring 72 may be banded to the coils 14 by the support band 74. Specifically, the band 74 is wrapped in several layers circumferentially around the coils 14 and the ring 72. Since the band 74 is preferably fabricated from a woven glass composite impregnated with epoxy, the band 74 is affixed to itself and hand tightened. Since the structure of the ring 72 and the band 74 are well known in the art, it will not be detailed further in this discussion.

In the prior art, the ring 72 is compressed between the brace 12 and the coils 14. In operation, the support ring 72 places a force on the coils 14 to support the coils 14. Due to this force, the vibration of the coils 14 is minimized. In order to transmit this force, a filler 76, preferably constructed from epoxy treated polyethylene terephthalate fibers or a similar material, is dispersed between the ring 72 and the coils 14 and the ring 72 and the brace 12.

As described above the stator 60 contracts during operation of the dynamo electric machine to which it is attached. When the stator 60 contracts, the brace 12 moves with it as described above. As this occurs, less pressure is exerted on the coils 14. This can cause the vibration of the coils 14 to increase and lower their characteristic frequency.

In order to minimize the vibration, in this embodiment of the invention a control mechanism 16 and a push block 18 are disposed between the ring 72 and the brace 12. The control mechanism 16 preferably includes one or more springs 39. Preferably, the springs 39 are conical springs. The springs may be Belleville® type fiberglass spring washers. As shown in the preferred embodiment, two springs 39 are dispersed between the brace 12 and the push block 18. As will be appreciated by those skilled in the art, the number of springs 39 used in the system can be changed to provide the requisite force. Alternatively, as will be appreciated by those skilled in the art, the force exerted by the springs 39 can be varied by changing the orientation of the springs 39 relative to each other.

These springs 39 are compressed between the push block 18 and the ring 72. As the brace 12 moves away from the coils 14, as described above, the springs 39 exert a force on the coils 14 and the brace 12. This force exerted by the springs 39 minimizes the vibration of the coils 14 caused by the movement of the stator 60 and the brace 12. As a result, the characteristic frequency of the coils 14 is maintained.

As is illustrated in FIG. 5, the control mechanism 16 may further include a retainer pin 78. The retainer pin 78 is preferably affixed to an aperture 80 in the push block 18 by cement or a similar affixing method. From the aperture 80 in the push block 18, the retainer pin 78 extends through the center of the conical shaped springs 39 and into an opening 82 in the brace 12. In operation, the retainer pin functions to minimize the movement of the springs 39 and retain them in place between the brace 12 and the push block 18.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A vibrational control system for coils of a stator in an electrodynamic apparatus, said system comprising:

a coil support brace mounted to the stator;

a push block compressed between the coils and the coil support brace;

a first spring interposed between said push block and said coil support brace for adjusting a characteristic frequency of the coils;

a first support ring positioned adjacent to one end of the push block and disposed between the coils and the coil support brace;

a second spring interposed between the coil support brace and the first support ring; and pins running laterally across a cavity in the coil support brace and at opposing longitudinal ends of the cavity, the pins being mounted above a lip at either end of the push block to restrain movement of the push block out of the cavity.

2. The system as described in claim 1, wherein the second spring is conical in shape.

3. The system as described in claim 1, further comprising a gap that is defined between a bottom surface of said push block and a top surface of said coil support.

4. The system as described in claim 1, further comprising a filler arranged between said coils and said push block.

5. The system as described in claim 1, wherein the first spring is compressed between a void in the push block and the cavity in the coil support brace.

6. The system as described in claim 1, wherein the first spring comprises a ripple spring.

7. The system as described in claim 6, further comprising a filler cap and a third layer of compressible material between the push block and the coils.

8. The system as described in claim 1, further comprising a second support ring disposed between the coils and the push block, and a third spring interposed between the coil support brace and the second support ring;

said first and second rings being positioned on opposite sides of said push block.

9. The system as described in claim 7, further comprising the ripple spring arranged in a cavity of the brace and stops on opposing longitudinal ends of the brace to maintain the ripple spring in the cavity.

* * * * *